(No Model.)
J. W. OWENS & O. McCLURE.
SMOKING PIPE.
No. 309,796. Patented Dec. 23, 1884.
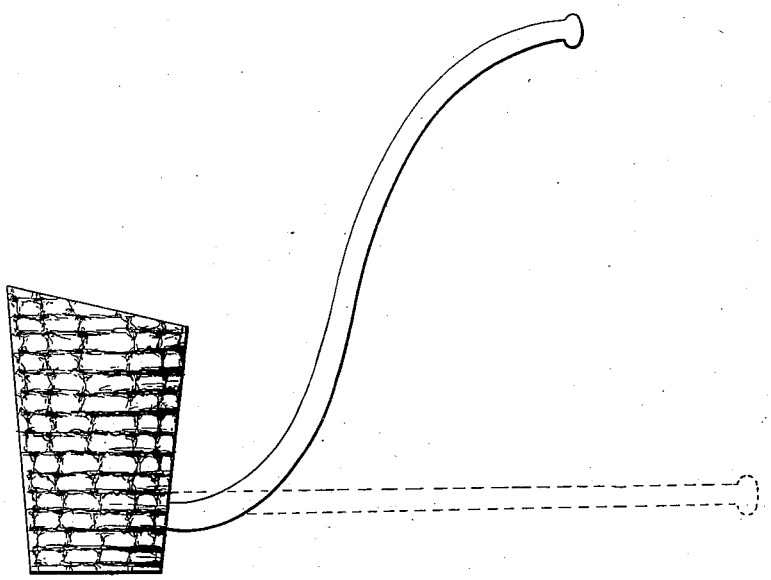
WITNESSES:
INVENTOR:
James W. Owens
Oscar McClure
BY Munn & Co
ATTORNEYS.

UNITED STATES PATENT OFFICE.

JAMES W. OWENS AND OSCAR McCLURE, OF WASHINGTON, MISSOURI.

SMOKING-PIPE.

SPECIFICATION forming part of Letters Patent No. 309,796, dated December 23, 1884.

Application filed March 14, 1884. (No model.)

*To all whom it may concern:*

Be it known that we, JAMES W. OWENS and OSCAR McCLURE, citizens of the United States, residing at Washington, in the county of Franklin and State of Missouri, have invented certain new and useful Improvements in Smoking-Pipes, of which the following is a description.

Our invention relates to certain improvements in that class of pipes which are made of corn-cobs; and it consists in a corn-cob pipe having its interstices filled with a peculiar composition designed to secure certain special advantages, and also in the composition, as hereinafter fully described.

Heretofore it has been common on the one hand to line a pipe-bowl with various fire-proof compositions to keep the combustible material of which the bowl was composed from charring, and on the other hand a corn-cob pipe has had its interstices filled with plaster-of-paris to render it solid, so as to facilitate turning the pipe into shape, and to stop up or fill the openings in the same. Our invention is more analogous in its objects to this latter method; but is distinguished therefrom by the following peculiarities: When a corn-cob pipe has its interstices filled with plaster-of-paris it has been found that the heat of the pipe in smoking causes the plaster-of-paris to shrink, crack, and fall out by calcining the water of crystallization in the plaster, leaving the pipe-bowl so open and porous as to interfere with the suction as well as disfigure the appearance of the pipe.

Our invention consists in filling the interstices of a corn-cob pipe with a compound of corn-starch and gamboge, to which we preferably add a little silica. The proportion of ingredients used is one pound of corn-starch, one-half ounce of gamboge, and one ounce of silica, which are mixed into a paste with water and applied to the pipe. This compound is characterized by the following advantages: First, the effect of heat is to expand instead of contracting the filling, and it therefore does not shrink, crack, and fall out, but keeps the interstices filled and the pipe air-tight; secondly, it forms a compound which is not permeable to nicotine, and avoids discoloration of the pipe, which discoloration is undesirable in a corn-cob pipe; thirdly, the gamboge forms a cement that holds the filling in its place, and is an inodorous substance that does not smell offensively as do shellac and other varnishes when heated. When silica is added it is used in the outer coating to give polish or hardness to the exterior, or may be mixed with the other ingredients.

In the drawings is shown an old form of corn-cob pipe whose interstices are filled with our new composition. It is obvious, however, that our invention is not limited to this form alone, but is applicable to all others.

Having thus described our invention, what we claim as new is—

1. A corn-cob pipe having its interstices filled with corn-starch and gamboge, as and for the purpose described.

2. A corn-cob pipe having its interstices filled with corn-starch and gamboge, and an admixture or outer coating of silica, as and for the purpose described.

3. A composition for filling the interstices of corn-cob pipes, consisting, essentially, of corn-starch and gamboge, compounded in or about the proportions described.

4. The special composition for filling the interstices of corn-cob pipes, consisting of corn-starch, gamboge, and silica, compounded in or about the proportions described.

JAMES W. OWENS.
OSCAR McCLURE.

Witnesses:
HERMAN BOSSE,
THOS. P. DIGGS.